W. S. KIRBY.
LOG CONNECTION FOR HAULING LINES.
APPLICATION FILED MAY 8, 1909.

1,025,472.

Patented May 7, 1912.

WITNESSES:

INVENTOR
Walter S. Kirby
BY
Gifford Bull
ATTORNEY

UNITED STATES PATENT OFFICE.

WALTER S. KIRBY, OF GEORGETOWN, SOUTH CAROLINA, ASSIGNOR TO THE LEDGER-WOOD MANUFACTURING COMPANY, A CORPORATION OF NEW YORK.

LOG CONNECTION FOR HAULING-LINES.

1,025,472.            Specification of Letters Patent.        Patented May 7, 1912.

Application filed May 8, 1909. Serial No. 494,862.

*To all whom it may concern:*

Be it known that I, WALTER S. KIRBY, a citizen of the United States, residing at Georgetown, in the county of Georgetown and State of South Carolina, have invented certain new and useful Improvements in Log Connections for Hauling-Lines, of which the following is a specification.

My invention relates generally to new and useful improvements in logging apparatus of that character or type embodying a cable or cables adapted to be secured to the logs for the purpose of pulling or snaking them from the point where felled to a common point for loading and shipment, or other operation, and more particularly to an attachment for engagement with a log for connecting the same to a hauling or snaking cable.

The objects of the invention are to provide an improved attachment for the purposes and uses stated which will be simple in construction and efficient in operation; which may be easily and expeditiously connected to a log, which will be applicable with equal efficiency to logs of varying diameter, and which will, during the pulling or snaking operation, automatically distribute or equalize the line of draft on the log to points on opposite sides of its axis so that the latter will at all times tend to snake with its longitudinal axis in line with the cable by which it is being hauled.

The invention consists in the improvements to be fully described hereinafter, and the novelty of which will be particularly pointed out and distinctly claimed.

I have fully and clearly illustrated my invention in the accompanying drawings to be taken as a part of this specification and wherein—

Figure 1:
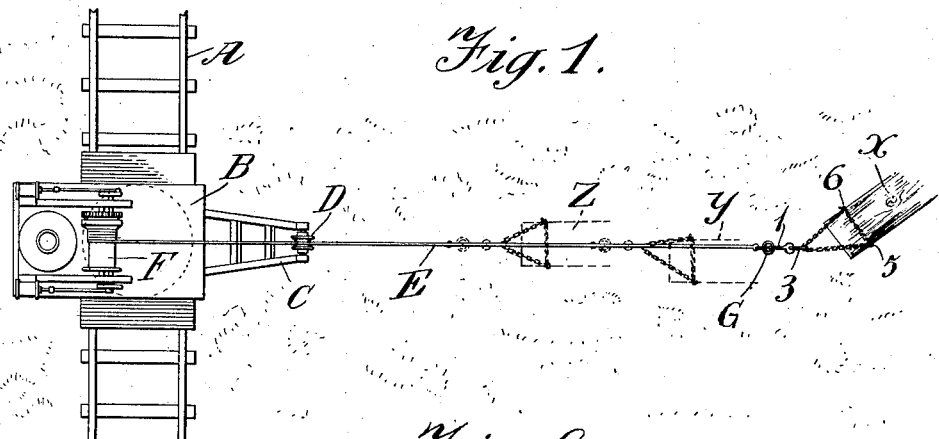
Figure 2:
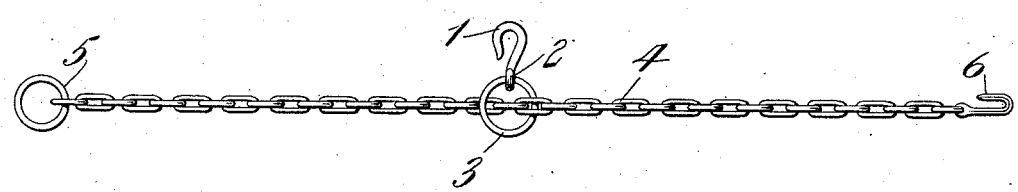
Figure 3:
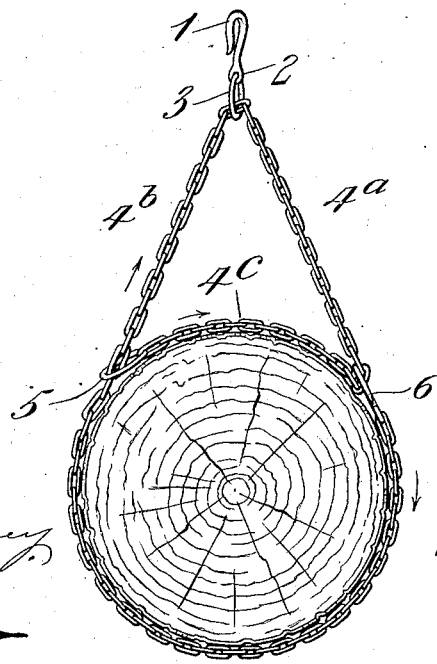

Figure 1 is a diagrammatic or plan view of a portable snaking and loading apparatus showing a single snaking cable having my improved log engaging attachment connected thereto, the attachment being shown in operative engagement with a log. Fig. 2 is a view of the attachment detached from a log. Fig. 3 is a view in elevation of the invention operatively engaged with a log, the latter being shown in section.

Referring to the drawings by characters of reference, A designates a track-way upon which moves a portable snaking and loading machine B, the latter including in its construction a pulling boom C, upon which is mounted one or more skidding blocks D, over which passes a snaking line E, one end of which is wound upon a suitable drum F, revolubly mounted upon the platform of the machine, and which is driven by any suitable power to wind the line thereon. The opposite end of the line E may be provided with a loop G the purpose of which will appear presently.

As the features just described form no part of my present invention, and are illustrated solely for the purpose of clearly illustrating the application of my invention, so that its use may be more easily understood, I do not deem it necessary to enter into a more detailed description of the same.

I will now proceed to describe my invention.

Broadly and generally the invention consists of an engaging means adapted to engage a log, and draft elements connected to said engaging means, and adapted for connection with a hauling line, means being provided for equalizing the pull on the draft elements.

The present embodiment of the invention consists in part of a flexible element adapted to be passed about a log and secured thereto, and a connecting device secured to the flexible element whereby the latter may be connected to the snaking line. The connecting device is capable of a wide variation of construction and form but for the purposes of this application, I have shown the same as comprising a hook 1, having its shank portion formed to provide an eye 2, in which is loosely mounted a guide-eye or ring 3, said hook being provided for engagement with the loop G, or other suitable coöperating element carried by the snaking line E.

Passing through the guide-eye 3, and having a free movement in both directions therethrough is a flexible element adapted to be passed about a log to be transported, said element being shown as preferably consisting of a chain 4, the end portions 4ᵃ and 4ᵇ of which extend on opposite sides of said connecting device as clearly shown in the drawings. This flexible element is provided at the end portion 4ᵃ with a guide or retaining element shown as consisting of a ring 5 secured preferably in place by being passed through one of the links of the chain and welded, although other means of securing said ring in place might be readily employed. The end portion 4ᵇ of the log-encircling element opposite to that carrying the ring 5 is provided with an engaging-device, shown in the form of an open hook 6, intended to engage the log-encircling element in a manner and for a purpose to be presently described.

In use the parts of the device are arranged and applied to the log as follows. The log-encircling element 4 is passed through the guide-eye 3 of the connecting device so that said guide-eye is located at a point intermediate the ends of said element 4, it being understood that the latter is free to slide in either direction through said guide-eye. The end portion 4ᵇ of the element 4 is then passed through the guide-eye 5, and said end portion is then placed around the log and the hook 6 engaged with the end portion 4ᵃ of the element 4 which carries the guide-eye 5. It will thus be apparent that a loop is formed which entirely surrounds the log, the loop being formed by the end portion 4ᵇ, of the flexible element which extends beyond the guide-eye 5, and that part 4ᶜ of the end portion 4ᵃ carrying the guide-eye 5 which is located between the point engaged by the hook 6 and said guide-eye 5. The connecting device, as the hook 1, is then connected to the snaking line, and the latter being drawn in, the loop is tightened about the log and the latter being securely held is hauled in by the line. When the hauling-in or snaking line is drawn in, it will be apparent that a pull will be directed upon both of the end portions 4ᵃ, 4ᵇ, of the log-encircling element, so that said end portions both constitute draft elements which are connected to the log at points on opposite sides of the longitudinal axis thereof, and that the normal tendency of the connecting device is to take a position where the lines of pull will be equal upon both elements, which will be a position with both elements of equal length on opposite sides of the connecting device from the latter to opposite sides of the log. The pull on end portion 4ᵇ, tends to draw the latter through the ring 5, and shorten that part of the said end portion extending between said ring 5 and the point of connection by the hook 6 with the end portion 4ᵃ. This operation pulls the part 4ᶜ located between the ring 5 and the point of engagement by the hook 6 down into close contact with the log so that the parts of the element 4 which surround the log are closely and positively engaged therewith, the construction being such that a slip loop is provided which is automatically adjusted to logs of varying diameter as soon as a pull is exerted upon the draft elements described.

In Fig. 1 of the drawings I have illustrated diagrammatically, the movements of a log from the point at which the line is connected thereto, through part of its course to the loader. At $x$ is shown a log lying at an angle to the direction of pull on the hauling line toward the loader, and the connecting device being applied thereto and connected with the line, it will be obvious that the guide-eye 3, will take a position substantially as shown with the draft elements of unequal length and both subjected to pull, but a greater force being directed upon the shorter draft element, the tendency will be to pull the log into the position generally shown at $y$ with one draft element taut and the other comparatively slack. The draft elements being as just described it is obvious that the connecting device will immediately seek a position to distribute the pull equally, which is at a point with both draft elements substantially equal in length from the hook 6, and the eye 5 to the connecting device, so that the log will be forced to track with its longitudinal axis in line with the hauling rope as shown at $z$.

Having thus described my invention, what I claim is:

1. A log connection for a hauling line, comprising a connecting device including a guide, a flexible log-encircling element movable in said guide and having portions extending on opposite sides of the latter, one of said portions having a guide through which the other portion is adapted to freely move, and means for connecting said last mentioned portion to the portion carrying the guide.

2. A log connection for a hauling line, comprising a connecting device including a guide, a flexible log-encircling element movable in said guide and having portions extending on opposite sides of the latter to constitute draft elements and a contractible loop connected with said elements and adapted to be contracted when said elements are subjected to pull.

3. A log connection for a hauling line, comprising a connecting device, means for engaging a log, a plurality of draft elements connected to said engaging means and the connecting device, and means whereby a pulling force exerted upon the connecting device is distributed equally to the draft elements.

4. A log connection for a hauling line comprising means for engaging a log, a plurality of flexible draft elements connected to said engaging means and an equalizing line connection movably engaging said flexible draft elements.

5. A log connection for a hauling line comprising a connecting device including a guide, a flexible log-encircling element movable in said guide and having portions extending on opposite sides of the latter to constitute draft elements, and log-encircling means, said draft elements being connected to the encircling means in such a manner that when the latter is applied to a log, the points of connection will be on opposite sides of the longitudinal axis of the log.

In testimony whereof, I have hereunto signed my name in the presence of two subscribing witnesses.

WALTER S. KIRBY.

Witnesses:
FRANK E. RAFFMAN,
C. G. HEYLMUN.

Copies of this patent may be obtained for five cents each, by addressing the "Commissioner of Patents, Washington, D. C."

It is hereby certified that the name of the assignee in Letters Patent No. 1,025,472, granted May 7, 1912, upon the application of Walter S. Kirby, of Georgetown, South Carolina, for an improvement in "Log Connections for Hauling-Lines," was erroneously written and printed "The Ledgerwood Manufacturing Company," whereas said name should have been written and printed *The Lidgerwood Manufacturing Company;* and that the said Letters Patent should be read with this correction therein that the same may conform to the record of the case in the Patent Office.

Signed and sealed this 28th day of May, A. D., 1912.

[SEAL.]
C. C. BILLINGS,
*Acting Commissioner of Patents.*